US00RE50521E

(19) United States
(12) Reissued Patent
Kamizori et al.

(10) Patent Number: US RE50,521 E
(45) Date of Reissued Patent: *Aug. 5, 2025

(54) LITHIUM SECONDARY BATTERY PACK, AS WELL AS ELECTRONIC DEVICE, CHARGING SYSTEM, AND CHARGING METHOD USING SAID PACK

(71) Applicant: Maxell, Ltd., Kyoto (JP)

(72) Inventors: Haruki Kamizori, Kyoto (JP); Masayuki Yamada, Kyoto (JP); Fusaji Kita, Kyoto (JP)

(73) Assignee: MAXELL, LTD., Kyoto (JP)

( * ) Notice: This patent is subject to a terminal disclaimer.

(21) Appl. No.: 18/088,334

(22) Filed: Dec. 23, 2022

Related U.S. Patent Documents

Reissue of:
(64) Patent No.: 10,044,072
Issued: Aug. 7, 2018
Appl. No.: 14/772,043
PCT Filed: Feb. 25, 2014
PCT No.: PCT/JP2014/054537
§ 371 (c)(1),
(2) Date: Sep. 1, 2015
PCT Pub. No.: WO2014/141875
PCT Pub. Date: Sep. 18, 2014

U.S. Applications:
(63) Continuation of application No. 16/987,159, filed on Aug. 6, 2020, now Pat. No. Re. 49,407.

(30) Foreign Application Priority Data

Mar. 11, 2013 (JP) ..... 2013-048298

(51) Int. Cl.
*H01M 10/0525* (2010.01)
*H01M 4/38* (2006.01)
(Continued)

(52) U.S. Cl.
CPC ..... *H01M 10/0525* (2013.01); *H01M 4/386* (2013.01); *H01M 4/48* (2013.01);
(Continued)

(58) Field of Classification Search
CPC ..... H01M 10/425; H01M 10/0525; H01M 4/587; H01M 10/052; H01M 4/48;
(Continued)

(56) References Cited

U.S. PATENT DOCUMENTS 5,861,733 A 1/1999 Yoshikawa
6,023,150 A * 2/2000 Patino ..... H02J 7/0004 320/132
(Continued)

FOREIGN PATENT DOCUMENTS

JP 08-195225 A 7/1996
JP 2004-47404 A 2/2004
(Continued)

OTHER PUBLICATIONS

International Search Report issued in PCT/JP2014/054537 dated Apr. 15, 2014.

*Primary Examiner* — Minh Nguyen
(74) *Attorney, Agent, or Firm* — Birch, Stewart, Kolasch & Birch, LLP

(57) ABSTRACT

A lithium secondary battery pack of the present invention includes: a lithium secondary battery including an electrode body formed of a positive electrode and a negative electrode facing each other and a separator interposed therebetween, and a non-aqueous electrolyte; a PTC element; and a protection circuit including a field effect transistor. The lithium secondary battery has an energy density per volume of 450 Wh/L or more, the lithium secondary battery has a current density of 3.0 mA/cm$^2$ or less, and a relational expression (1) and a relational expression (2) below are established where A (mΩ) is an impedance of the lithium secondary battery
(Continued)

and B (mΩ) is an impedance of the entire circuit unit of the lithium secondary battery pack excepting the impedance A (mΩ) of the lithium secondary battery:

$$A \leq 50\ m\Omega \quad (1)$$

$$B/A \leq 1 \quad (2).$$

20 Claims, 3 Drawing Sheets

(51) Int. Cl.

| | |
|---|---|
| ***H01M 4/48*** | (2010.01) |
| ***H01M 4/587*** | (2010.01) |
| ***H01M 10/052*** | (2010.01) |
| ***H01M 10/0585*** | (2010.01) |
| ***H01M 10/42*** | (2006.01) |
| ***H01M 10/44*** | (2006.01) |
| ***H01M 10/46*** | (2006.01) |
| ***H01M 10/637*** | (2014.01) |
| ***H01M 50/209*** | (2021.01) |
| ***H02J 7/00*** | (2006.01) |

(52) U.S. Cl.
CPC ..... *H01M 4/483* (2013.01); *H01M 4/587* (2013.01); *H01M 10/052* (2013.01); *H01M 10/0585* (2013.01); *H01M 10/425* (2013.01); *H01M 10/441* (2013.01); *H01M 10/46* (2013.01); *H01M 10/637* (2015.04); *H01M 50/209* (2021.01); *H02J 7/00* (2013.01); *H02J 7/0013* (2013.01); *H01M 2010/4271* (2013.01); *H01M 2200/106* (2013.01); *H01M 2200/30* (2013.01); *Y02E 60/10* (2013.01); *Y02P 70/50* (2015.11); *Y02T 10/70* (2013.01)

(58) Field of Classification Search
CPC .. H01M 10/441; H01M 4/483; H01M 50/209; H01M 10/0585; H01M 10/637; H01M 4/386; H01M 10/46; H01M 2010/4271; H01M 2200/106; H01M 2220/30; H02J 7/0013; H02J 7/00; Y02P 70/50; Y02E 60/10; Y02T 10/70
See application file for complete search history.

(56) References Cited

U.S. PATENT DOCUMENTS

| | | | | |
|---|---|---|---|---|
| 6,204,639 | B1 | 3/2001 | Takano et al. | |
| 2003/0215711 | A1 | 11/2003 | Aramata et al. ..... | H01M 4/625 252/502 |
| 2005/0233213 | A1 | 10/2005 | Lee et al. | |
| 2006/0152194 | A1* | 7/2006 | Wang ..... | H02J 7/0071 320/121 |
| 2011/0305926 | A1 | 12/2011 | Kim et al. ..... | H02J 7/0031 429/50 |
| 2011/0316487 | A1 | 12/2011 | Nakai et al. | |
| 2012/0007564 | A1 | 1/2012 | Muraoka et al. ..... | H01M 10/44 429/223 |
| 2012/0091966 | A1 | 4/2012 | Mori | |
| 2012/0288742 | A1 | 11/2012 | Tanaka et al. | |
| 2014/0227562 | A1 | 8/2014 | Kamizori et al. | |
| 2014/0234535 | A1 | 8/2014 | Lee et al. | |

FOREIGN PATENT DOCUMENTS

| | | | |
|---|---|---|---|
| JP | 2004-047404 | A | 2/2004 |
| JP | 2005-259697 | A | 9/2005 |
| JP | 2006-197797 | A | 7/2006 |
| JP | 2008-104349 | A | 5/2008 |
| JP | 2008-210618 | A | 9/2008 |
| JP | 2009-54469 | A | 3/2009 |
| JP | 2010-97751 | A | 4/2010 |
| JP | 2011-76997 | A | 4/2011 |
| JP | 2011-259696 | A | 12/2011 |
| JP | 2014-32802 | A | 2/2014 |
| JP | 2014-032802 | A | 2/2014 |
| KR | 10-2012-0080256 | A | 7/2012 |
| WO | WO 2011/065009 | A | 6/2011 |
| WO | WO 2011/065009 | A1 | 6/2011 |
| WO | WO 2011/070748 | A1 | 6/2011 |
| WO | WO 2013/038939 | A | 3/2013 |
| WO | WO 2013/038939 | A1 | 3/2013 |
| WO | WO 2013/108336 | A1 | 7/2013 |
| WO | WO 2013/133361 | A1 | 9/2013 |

* cited by examiner

LITHIUM SECONDARY BATTERY PACK, AS WELL AS ELECTRONIC DEVICE, CHARGING SYSTEM, AND CHARGING METHOD USING SAID PACK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This Application is a reissue continuation of Reissue Application No. 16/987,159 filed Aug. 6, 2020, which is a Reissue of U.S. Patent No. 10,044,072 issued on Aug. 7, 2018, which is the National Phase of PCT International Application No. PCT/JP2014/054537 filed on Feb. 25, 2014, which claims the priority benefit under 35 U.S.C. §119(a) to Japanese Patent Application No. 2013-048298 filed on Mar. 11, 2013, all of which are hereby expressly incorporated by reference into the present application. More than one Reissue Application has been filed for U.S. Patent No. 10,044,072: the present application and U.S. application No. 16/987,159.*

TECHNICAL FIELD

The present invention relates to a lithium secondary battery pack having excellent fast-charging characteristics, and an electronic device, a charging system, and a charging method using the same.

BACKGROUND ART

Non-aqueous secondary batteries including, for example, lithium secondary batteries have a high voltage and a high capacity, and thus are widely used as power sources for mobile phones, and also for various other portable devices such as smartphones and tablet terminals in recent years. They also have found medium- and large-sized applications including power tools such as electric tools, electric cars, and power-assisted bicycles.

In a standard charging method commonly used for lithium secondary batteries, when 1 C is the current value with which a fully charged battery can be discharged in one hour, constant-current (CC) charging is performed with a current of about 0.7 to 1 C until a predetermined end-of-charge voltage is reached. After the end-of-charge voltage has been reached, charging is switched to constant voltage (CV) charging in which the charge current is decreased so as to maintain the end-of-charge voltage.

Meanwhile, there is also a need to complete the charging of batteries as fast as possible. For example, in the case of lithium secondary batteries for mobile phones, conventional lithium secondary batteries for mobile phones can be brought into a fully charged or nearly fully charged state by being charged with a current value of 1 C or less for about 2 to 4 hours. However, with the sophisticated functions of devices, such as mobile phones, to which lithium secondary batteries are applied, and with the wide spread use of smartphones and tablet terminals, which have a larger size than mobile phones, lithium secondary batteries are required to have a higher capacity. Accordingly, charging with a current value that is about the same as conventionally used current values may increase the time required to reach a fully charged state to be longer than the practical range. For example, for a battery having a high capacity exceeding 1500 mAh, the current value corresponding to 1 C is relatively large. In order to prevent heat generation resulting from charging at a large current, it is required to charge with a value as low as about 0.7 C, and as a result the time required for charging will be increased. Thus, in order to avoid this, there is a need to develop a technique for enabling charging with a larger current value to achieve a higher capacity, while reducing the time.

To meet this need, there have been proposed, for example, a method of enhancing fast-charging characteristics by using a plurality of positive electrode active materials in combination (Patent document 1), a method of increasing the output (improving the load characteristics) and enhancing the fast-charging characteristics by using a lithium-titanium composite oxide for the negative electrode (Patent document 2), and a method of ensuring favorable battery characteristics even after fast charging by adding an insulating inorganic oxide filler to the negative electrode, separately from an active material (Patent document 3).

From the viewpoint of simply enhancing the load characteristics of lithium secondary batteries, it has been reported that the use of $SiO_x$ having a structure in which Si ultrafine particles are dispersed in $SiO_2$ as a negative electrode active material is effective (Patent documents 4 and 5).

On the other hand, for devices, such as an electric tool, from which a battery pack is removed from the device body and charged, there has been proposed a method in which an abrupt temperature rise of the battery pack due to fast charge is suppressed forcibly, thereby allowing charging to be performed with a current exceeding 1 C and thus reducing the charging time (Patent document 6).

PRIOR ART DOCUMENTS

Patent Documents

Patent document: 1 JP 2011-076997A
Patent document 2: JP 2010-097751A
Patent document 3: JP 2009-054469A
Patent document 4: JP 2004-047404A
Patent document 5: JP 2005-259697A
Patent document 6: JP 2008-104349A

Problem to be Solved by the Invention

Although the conventional methods for reducing the charging time described in the above patent documents have been shown to have an adequate effect, there is a need to further enhance the fast-charging characteristics. For example, one possible way to improve the fast-charging characteristics of a lithium secondary battery is to enhance the load characteristics of the battery. However, according to the studies made by the present inventors, the use of a battery having enhanced load characteristics to constitute a battery pack including a PTC element, a protection circuit, and so forth, such as the one applied to a portable device, has been shown to achieve some degree of improvement in the fast-charging characteristics, but the degree of improvement often does not reach a predicted level, proving that simply enhancing the load characteristics is not sufficient.

The present invention has been made in order to solve the above-described problems, and provides a lithium secondary battery pack having excellent fast-charging characteristics, and an electronic device, a charging system, and a charging method using the same.

DISCLOSURE OF INVENTION

Means for Solving Problem

In order to solve the above-described problems, a first lithium secondary battery pack of the present invention is a lithium secondary battery pack including: a lithium secondary battery including an electrode body and a non-aqueous electrolyte, the electrode body including a positive electrode and a negative electrode facing each other and a separator interposed therebetween; a PTC element; and a protection circuit including a field effect transistor, wherein the negative electrode includes a negative electrode material mixture layer containing a Si-containing material as a negative electrode active material, the lithium secondary battery has an energy density per volume of 450 Wh/L or more, the lithium secondary battery has a current density of 3.0 $mA/cm^2$ or less, and, relational expressions (1) and (2) below are established where A represents an impedance (mΩ) of the lithium secondary battery and B represents an impedance (mΩ) of the entire circuit unit of the lithium secondary battery pack excepting the impedance A (mΩ) of the lithium secondary battery:

$$A \leq 50\ m\Omega \quad (1)$$

$$B/A \leq 1 \quad (2).$$

A second lithium secondary battery pack of the present invention is a lithium secondary battery pack including: a lithium secondary battery including an electrode body and a non-aqueous electrolyte, the electrode body including a positive electrode and a negative electrode facing each other and a separator interposed therebetween; a PTC element; and a protection circuit including a field effect transistor, wherein the positive electrode includes a positive electrode material mixture layer containing a Ni-containing material as a positive electrode active material, the lithium secondary battery has an energy density per volume of 450 Wh/L or more, the lithium secondary battery has a current density of 3.0 $mA/cm^2$ or less, and, relational expressions (1) and (2) below are established where A represents an impedance (mΩ) of the lithium secondary battery and B represents an impedance (mΩ) of the entire circuit unit of the lithium secondary battery pack excepting the impedance A (mΩ) of the lithium secondary battery:

$$A \leq 50\ m\Omega \quad (1)$$

$$B/A \leq 1 \quad (2).$$

An electronic device of the present invention uses the above-described lithium secondary battery pack of the present invention.

A charging system of the present invention uses the above-described lithium secondary battery pack of the present invention.

A charging method of the present invention uses the above-described lithium secondary battery pack of the present invention.

Effects of the Invention

According to the present invention, it is possible to provide a lithium secondary battery pack having excellent fast-charging characteristics, and an electronic device, a charging system, and a charging method using the same.

DESCRIPTION OF THE INVENTION

Figure 1:
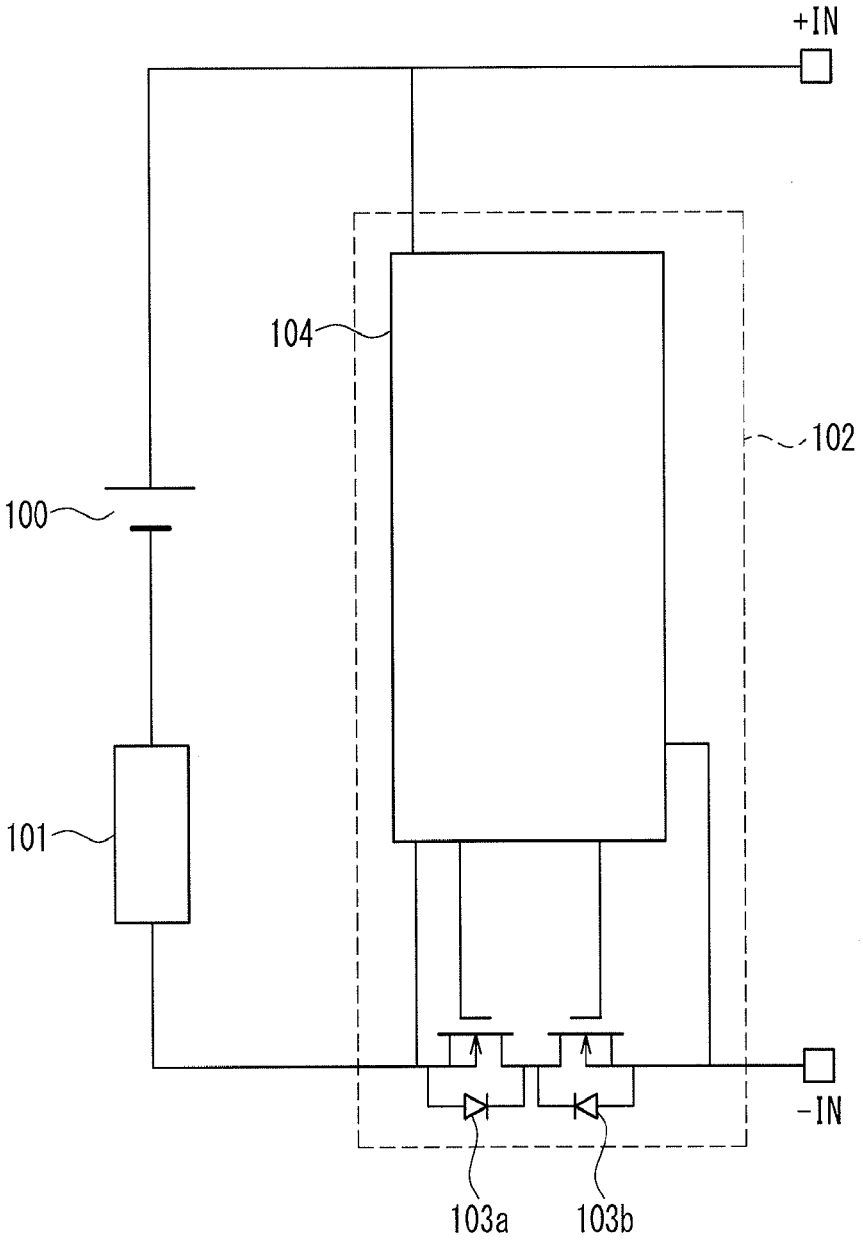
FIG. 1 is a circuit diagram showing an example of a lithium secondary battery pack according to the present invention.

In constant current (CC)-constant voltage (CV) charging of a lithium secondary battery pack, the charge capacity per unit time is usually larger in the constant current charging period than in the constant voltage charging period. Thus, the time required from the start of charging a lithium secondary battery pack until the lithium secondary battery pack is fully charged can be significantly reduced by increasing the region where CC charging can be performed and increasing the charge current.

As a result of intensive studies, the present inventors found that when a battery pack incorporating a prismatic lithium secondary battery having a capacity of 1620 mAh and a current density of 2.42 $mA/cm^2$ and a protection circuit having a resistance value in a range of 25 to 33 mΩ is produced and charged with a current value of 1.5 C, whereby the battery pack can be charged by CC charging up to 80% of the capacity of the battery pack. Based on this finding, the inventors have found that by adjusting the impedance and the energy density of the cell of the lithium secondary battery pack so as to have a specific relationship, it is possible to reduce a voltage increase of the lithium secondary battery pack during charging and to ensure a CC charging region that cannot be ordinarily expected, which makes it possible to minimize the attenuation of current during charging, and greatly enhance the fast-charging characteristics, thereby significantly reducing the time required from the start of charging until a fully charged state is reached without the need of a special operation such as forcibly cooling the battery pack, as compared with conventional methods in which charging is performed with a current value of 1 C or less, for example. As a result, the inventors have achieved the present invention.

That is, a lithium secondary battery pack of the present invention includes: a lithium secondary battery including an electrode body and a non-aqueous electrolyte, the electrode body including a positive electrode and a negative electrode facing each other and a separator interposed therebetween, a PTC element, and a protection circuit including a field effect transistor. The lithium secondary battery has an energy density per volume of 450 Wh/L or more, the lithium secondary battery has a current density of 3.0 $mA/cm^2$ or less, and, relational expressions (1) and (2) below are established where A represents an impedance (mΩ) of the lithium secondary battery and B represents an impedance (mΩ) of the entire circuit unit of the lithium secondary battery pack excepting the impedance A (mΩ) of the lithium secondary battery:

$$A \leq 50 m\Omega \quad (1)$$

$$B/A \leq 1 \quad (2).$$

Thereby, a lithium secondary battery pack having excellent fast-charging characteristics and a high capacity can be provided.

FIG. 1 is a circuit diagram showing an example of a lithium secondary battery pack according to the present invention. The lithium secondary battery pack shown in FIG. 1 includes a lithium secondary battery 100, a PTC (Positive Temperature Coefficient) element (PTC thermistor) 101, a protection circuit 102, and external terminals +IN and −IN. These components are connected by a lead wire to supply power to an external load from a positive electrode terminal and a negative electrode terminal of the lithium secondary battery 100 via the external terminals +IN and −IN, or to externally charge the lithium secondary battery pack.

The PTC element 101 has the function of interrupting the current in response to a rise in temperature. The protection circuit 102 includes a field effect transistor (FET) 103a serving as a switching element for turning the discharge current on or off, an FET 103b serving as a switching element for turning the charge current on or off, and a control unit 104 for detecting the battery voltage and the voltage across the FETs 103a and 103b during charging and discharging, and controlling the operations of FETs 103a and 103b according to the detected voltages. The protection circuit 102 has the function of protecting the lithium secondary battery from overcharge and overdischarge, as well as overcurrent during charging and discharging. Although FIG. 1 shows an example in which two FETs that are connected in parallel, the FETs may be connected in series, or the number of FETs may be one.

For example, the lithium secondary battery pack according to the present invention may have a structure in which the components shown in FIG. 1, such as the lithium secondary battery 100, the PTC element 101 and the protection circuit 102, are housed in an outer case.

The configuration of the lithium secondary battery pack according to the present invention is not limited to the configuration shown in FIG. 1. For example, although FIG. 1 shows an exemplary lithium secondary battery pack including one lithium secondary battery 100, the lithium secondary battery pack of the present invention may have a plurality of lithium secondary batteries 100 according to the required capacity.

The lithium secondary battery used in the lithium secondary battery pack of the present invention is set to have an energy density of 450 Wh/L or more, which is a high-capacity lithium secondary battery capable of fast charging so as to extend the battery life of the mobile device and to allow charging in a short time, thereby providing a favorable operability to an average user.

In the present invention, the energy density D (Wh/L) of the lithium secondary battery used for the above-described lithium secondary battery pack is determined by an equation (3) below from the rated capacity Q (Ah) of the lithium secondary battery pack, the average voltage E (V) of the lithium secondary battery and the cell volume V (L) of the lithium secondary battery.

$$\text{Energy density (D)} = \text{Rated capacity Q} \times \text{Average voltage E/Cell volume V} \quad (3)$$

As the rated capacity Q for calculating the energy density D, a value determined by the following method is used. Specifically, the lithium secondary battery pack is subjected to constant current charging with a current value of 1.0 C at 25° C. After the voltage value has reached 4.2 V, the lithium secondary battery pack is further subjected to constant voltage charging with a voltage value of 4.2 V, and charging is terminated when the total charging time reaches 2.5 hours. The charged lithium secondary battery pack is discharged at 0.2 C, and discharging is stopped when the voltage value reaches 3 V. Then, the quantity of electricity discharged is determined, and 96% of the determined quantity of electricity discharged is used as the rated capacity Q.

For the above-described average voltage V, a value obtained by integrating the discharging capacity in a range of 4.2 to 3.0 V obtained by measurement of the above-described capacity of electricity discharged and the voltage. For the cell thickness used for determining the cell voltage, the thickness in the fully-charged state under the above-described condition was used.

The current density of the lithium secondary battery used for the lithium secondary battery pack of the present invention is set to be 3.0 mA/cm$^2$ or less, and more preferably, 2.5 mA/cm$^2$ or less. In the present invention, the current density is calculated by an equation (4) below:

$$\text{Current density (mA/cm}^2\text{)} = \text{1.0 C current value (mA) of lithium secondary battery/Area (cm}^2\text{) of positive electrode material mixture layer} \quad (4)$$

In a case where the current density exceeds 3.0 mA/cm$^2$ even in a lithium secondary battery having an energy density of 450 Wh/L or more, the CC charging region is shortened during fast charging. Therefore, it is required to set the current density to be 3.0 mA/cm$^2$ or less.

The impedance A (mΩ) of the lithium secondary battery used for the lithium secondary battery pack of the present invention is set to be 50 mΩ or less as indicated in the above relational expression (1), thereby the charging time can be shortened further.

When B (mΩ) is an impedance of the entire circuit unit of the lithium secondary battery pack excepting the impedance A (mΩ) of the lithium secondary battery, as indicated in the above-described relational expression (2), the impedance index expressed as B/A is set to be 1 or less, more preferably 0.8 or less, and further preferably 0.4 or less. By setting the impedance index B/A to be 1 or less in the lithium secondary battery pack, it is possible to increase the CC charging time during charging of the lithium secondary battery pack, thereby improving the fast-charging characteristics.

Although a smaller impedance index is preferred, it is ordinarily 0.3 or more when taking technological limitations into consideration.

In the present invention, for the impedance to calculate the above-described impedance index, a value measured by using an LCR meter under the condition of 25° C., 1 kHz, is used. The impedance B (mΩ) of the entire circuit unit of the lithium secondary battery pack excepting the impedance A (mΩ) of the lithium secondary battery is determined by subtracting the impedance A of the lithium secondary battery from the impedance of the entire circuit unit of the lithium secondary battery pack measured under the above-described conditions.

An example of the method for controlling the impedance of the lithium secondary battery pack is the use of a material having a low resistance value for each of the lithium secondary battery, the PTC element, and the protection circuit (the FETs included therein) serving as components of the lithium secondary battery pack, and also the lead wire for connecting these components. For example, for the PTC element and the FETs, it is preferable to select a material having a resistance value lower than that used for a conventional lithium secondary battery pack for mobile phones (a lithium secondary battery pack having such a capacity that the battery pack can reach a fully charged state by being charged with a current value of 1 C or less for about an hour). In particular, lowering the resistance of the entire circuit by using a material having a low resistance value for the FETs or connecting the FETs in parallel can significantly contribute to a reduction in the overall impedance of the lithium secondary battery pack.

As described above, in order to enhance the fast-charging characteristics of the lithium secondary battery pack, it is preferable to increase the charge current value during CC-CV charging and increase the region where charging can be performed by CC charging. Specifically, it is preferable that the capacity that can be charged by CC charging exceeds 80% of the capacity of the lithium secondary battery pack.

The lithium secondary battery of the lithium secondary battery pack according to the present invention includes an electrode body and a non-aqueous electrolyte, the electrode body including a positive electrode including a positive electrode material mixture layer and a negative electrode including a negative electrode material mixture layer facing each other, and a separator interposed therebetween. In the following, the components of the lithium secondary battery will be described.

<Negative Electrode>

As the negative electrode included in the lithium secondary battery constituting the lithium secondary battery pack according to the present invention, for example, a negative electrode, having a structure in which a negative electrode material mixture layer containing a negative electrode active material, a binder, and so forth is provided on one or both sides of a current collector, can be used.

It is preferable that an Si-containing material is used as the negative electrode active material contained in the negative electrode material mixture layer. This makes it possible to constitute a lithium secondary battery that can form a lithium secondary battery pack that is less susceptible to an increase in voltage during charging. Examples of the Si-containing material include Si-based active materials such as alloys, oxides, and carbides containing Si as a constituent element, and it is preferable to use a material represented by the general compositional formula $SiO_x$ (where the atomic ratio x of 0 to Si is $0.5 \leq x \leq 1.5$) that contains Si and O as constituent elements. Hereinafter, a material containing Si and O as constituent elements is referred to as "$SiO_x$". The Si-containing materials may be used alone or in a combination of two or more.

The $SiO_x$ is not limited to oxides of Si, and may be composite oxide of Si and another metal (e.g., B, Al, Ga, In, Ge, Sn, P, or Bi), or may contain a microcrystalline or amorphous phase of Si and another metal, as long as the overall atomic ratio x of 0 to Si satisfies $0.5 \leq x \leq 1.5$.

Examples of the $SiO_x$ include materials having a structure in which Si (e.g., microcrystalline Si) is dispersed in an amorphous $SiO_2$ matrix. It is sufficient that the above-described atomic ratio x satisfies $0.5 \leq x \leq 1.5$ when this amorphous $SiO_2$ and the Si dispersed therein are combined. For example, in the case of a material having a structure in which Si is dispersed in the amorphous $SiO_2$ matrix and the molar ratio of $SiO_2$ and Si is 1:1, x=1, and therefore, the material is represented as SiO in the present invention. In the case of a material having such a structure, for example, any peak attributed to the presence of Si (microcrystalline Si) may not be observed by an X-ray diffraction analysis, but an observation with a transmission electron microscope can confirm the presence of fine Si. To increase the effect of compositing with a carbon material described below and prevent micronization during charging and discharging, it is preferable to use $SiO_x$ having a number average particle size of about 0.5 to 10 μm, measured with a laser diffi-action scattering-type particle size distribution analyzer, for example, "MICROTRAC HRA" manufactured by NIKKISO CO., LTD.

Incidentally, the above-described $SiO_x$ has poor conductivity. Thus, in the case of using the $SiO_x$ alone as the negative electrode active material, a conductivity enhancing agent such as a carbon material is necessary from the viewpoint of ensuring favorable battery characteristics. However, rather than using a mixture obtained by simply mixing $SiO_x$ with a carbon material as the negative electrode active material, it is more preferable to use a composite (hereinafter referred to as a $SiO_x$/carbon composite) including a $SiO_x$ serving as a core material and a carbon coating layer formed on the surface thereof. In this case, a favorable conductive network is formed in the negative electrode, making it possible to improve the load characteristics of the lithium secondary battery.

Furthermore, in the case of using a $SiO_x$/carbon composite as the negative electrode active material, it is possible to improve the storage characteristics of the composite while maintaining its property of having a high capacity by optimizing the amount of carbon to be deposited on the surface of the core material and the state thereof.

The above-described $SiO_x$ serving as the core material can be produced by a conventionally known method. Examples of $SiO_x$ include $SiO_x$ primary particles, $SiO_x$ composite particles containing a plurality of $SiO_x$ primary particles, and granules obtained by granulating $SiO_x$ together with a carbon material for the purpose of improving the conductivity of the core material.

The above-described $SiO_x$/carbon composite may be obtained, for example, by heating $SiO_x$ particles and a hydrocarbon-based gas in a vapor phase, and depositing carbon resulting from thermal decomposition of the hydrocarbon-based gas onto the surface of the $SiO_x$ particles. By producing the $SiO_x$/carbon composite using chemical vapor deposition (CVD) in this manner, the hydrocarbon-based gas is distributed throughout the $SiO_x$ particles, so that a thin and uniform coating (carbon coating layer) containing a conductive carbon material can be formed on the surface of the particles and in the pores on the surface of the particles. Thus, it is possible to uniformly impart conductivity to the $SiO_x$ particles by using a small amount of the carbon material.

The treatment temperature (atmospheric temperature) in the above-described chemical vapor deposition (CVD) varies depending on the type of the above-described hydrocarbon-based gas, and ordinarily, a temperature of 600 to 1200° C. is suitable. In particular, the treatment temperature is preferably 700° C. or higher, even more preferably 800° C. or higher. This is because the use of a higher treatment temperature enables the formation of a coating layer having less residual impurities and containing carbon having high conductivity.

Toluene, benzene, xylene, mesitylene, or the like can be used as the liquid source for the hydrocarbon-based gas. For ease of handling, toluene is particularly preferable. The hydrocarbon-based gas can be obtained by evaporating the liquid source (for example, by bubbling with a nitrogen gas). It is also possible to use methane gas, acetylene gas, or the like.

After the surface of the $SiO_x$ particles is coated with a carbon material by using the chemical vapor deposition (CVD), at least one organic compound selected from the group consisting of a petroleum pitch, a coal pitch, a thermosetting resin, and a condensate of a naphthalenesulfonic acid salt and an aldehyde may be attached to the coating layer containing the carbon material, and the particles to which the organic compound has been attached may be baked. Specifically, a dispersion prepared by dispersing the $SiO_x$ particles, whose surface has been coated with the carbon material and the organic compound in a dispersion medium, is sprayed and dried to form particles coated with the organic compound, and the obtained particles coated with the organic compound are then baked.

An isotropic pitch can be used as the above-described pitch. A phenol resin, a furan resin, a furfural resin, or the like can be used as the above-described thermosetting resin. A naphthalene sulfonic acid formaldehyde condensate can be used as the condensate of a naphthalenesulfonic acid salt and an aldehyde.

As the dispersion medium for dispersing the $SiO_x$ particles whose surface has been coated with the carbon material and the organic compound, for example, water or an alcohol (e.g., ethanol) can be used. Usually, it is appropriate to carry out the spraying of the dispersion in an atmosphere of 50 to 300° C. Usually, the baking temperature is suitably 600 to 1200° C., and in particular, preferably 700° C. or higher, even more preferably 800° C. or higher. This is because the use of a higher treatment temperature enables the formation of a coating layer having less residual impurities and containing a high-quality carbon material having high conductivity. Note, however, that the treatment temperature needs to be equal to or lower than the melting point of the $SiO_x$.

The conductivity may be poor when the amount of carbon deposited on the surface of the $SiO_x$ serving as the core material is too small, whereas the effect of using the $SiO_x$, which has high capacity, may not be sufficiently achieved when the amount is too large. Thus, the amount of carbon deposited is preferably 1 to 30 mass % with respect to the total amount of the composite of the $SiO_x$ and the carbon material.

The average particle size $D_{50}$ of the $SiO_x$/carbon composite is preferably 0.5 μm or more from the viewpoint of suppressing the reduction in capacity after repeated charging and discharging of the lithium secondary battery pack, and is preferably 20 μm or less from the viewpoint of suppressing the expansion of the negative electrode due to charging and discharging of the lithium secondary battery pack. Note that the above-described average particle size $D_{50}$ is an average particle size on a volume basis measured by dispersing the $SiO_x$/carbon composite in a medium that does not dissolve resin and measured using a laser scattering particle size distribution analyzer (e.g., "LA-920" manufactured by Horiba, Ltd.).

While the specific resistance value of the $SiO_x$ is usually $10^3$ to $10^7$ kΩcm, the specific resistance value of the carbon material coating the $SiO_x$ is usually 10 to 10 kΩcm.

As the above-described negative electrode included in the lithium secondary battery, another active material can be used as the negative electrode active material together with the above-described $SiO_x$. As the other active material, for example, a graphite carbon material is preferable. Graphite carbon materials that are used for conventionally known lithium secondary batteries are preferable, and examples thereof include natural graphite such as flake graphite, and artificial graphite obtained by graphitizing an graphitizable carbon such as a thermally decomposed carbon, mesophase carbon microbeads (MCMB), or carbon fiber at 2800° C. or higher.

From the viewpoint of increasing the capacity of the lithium secondary battery and further improving the fast-charging characteristics of the lithium secondary battery pack, the amount of the $SiO_x$ contained in the above-described negative electrode active material is preferably 2.5 mass % or more, and more preferably 5 mass % or more, with respect to the total amount of the negative electrode active material. When the amount of the $SiO_x$ contained is large, the initial capacity increases, but the capacity of the lithium secondary battery may be reduced with charging/discharging. Accordingly, it is necessary to determine the amount of usage in consideration of a balance between the required capacity and the charge/discharge cycle characteristics. Thus, in order to suppress a capacity reduction during charging/discharging of the battery that is caused by a change in volume of the $SiO_x$ during charging/discharging so as to improve the charge/discharge cycle characteristics of the lithium secondary battery pack, the amount of the $SiO_x$ contained in the negative electrode active material is preferably 30 mass % or less, more preferably 10 mass % or less, even more preferably 5 mass % or less, with respect to the total amount of the negative electrode active material.

For example, polyvinylidene fluoride (PVDF), polytetrafluoroethylene (PTFE), styrene-butadiene rubber (SBR), carboxymethyl cellulose (CMC), a polyacrylic acid salt, polyimide, or polyamideimide is preferably used as the binder used for the negative electrode material mixture layer.

A conductive material may be further added to the negative electrode material mixture layer as a conductivity enhancing agent. There is no particular limitation on the conductive material as long as it does not undergo a chemical change in lithium secondary battery and it is possible to use one or more of materials, including, for example, carbon blacks such as acetylene black and ketjen black, carbon nanotube, and carbon fiber.

The negative electrode according to the present invention can be produced, for example, through a process involving preparing a paste or slurry negative electrode material mixture-containing composition in which the negative electrode active material and the binder, and optionally the conductivity enhancing agent are dispersed in a solvent such as N-methyl-2-pyrrolidone (NMP) or water (however, the binder may be dissolved in the solvent), applying the composition to one or both sides of a current collector, followed by drying, and thereafter optionally performing pressing. Note, however, that the negative electrode is not limited to a negative electrode produced by the above-described production method, and may be a negative electrode produced by other production methods.

The thickness of the negative electrode material mixture layer, per side of the current collector, is preferably 10 to 100 μm. The density (calculated from the mass per unit area and the thickness of the negative electrode material mixture layer laminated on the current collector) of the negative electrode material mixture layer is preferably 1.0 to 1.9 g/cm$^3$. As the composition of the negative electrode material mixture layer, the total amount of the negative electrode active material is preferably 80 to 99 mass %, the amount of the binder is preferably 1 to 20 mass %, and the conductivity enhancing agent (if used) is preferably used in an amount within the range in which the total amount of the negative electrode active material and the amount of the binder satisfy the above-described preferable values.

A foil, a punched metal, a mesh, an expanded metal, or the like made of copper or nickel can be used as the current collector of the negative electrode. Usually, a copper foil is used. The negative electrode current collector preferably has an upper limit thickness of 30 μm when the overall thickness of the negative electrode is reduced to obtain a high energy density battery, and it preferably has a lower limit thickness of 5 μm in order to ensure the mechanical strength.

<Positive Electrode>

As the positive electrode of the lithium secondary battery constituting the lithium secondary battery pack of the present invention, it is possible to use, for example, a positive electrode having a structure including a positive electrode material mixture layer containing a positive electrode active material, a conductivity enhancing agent, a binder, and so forth on one or both sides of a current collector.

A Li (lithium)-containing transition metal oxide or the like that is capable of absorbing and desorbing Li ions is used as the positive electrode active material. Examples of the Li-containing transition metal oxide include those used for conventionally known lithium secondary batteries. Specific examples thereof include Li-containing transition metal oxides having a layered structure, such as $Li_yCoO_2$ (where $0 \leq y \leq 1.1$), $Li_zNiO_2$ (where $0 \leq z \leq 1.1$), $Li_pMnO_2$ (where $0 \leq p \leq 1.1$), $Li_qCo_rM^1_{1-r}O_2$ (where $M^1$ is at least one metal element selected from the group consisting of Mg, Mn, Fe, Ni, Cu, Zn, Al, Ti, Ge, and Cr, and $0 \leq q \leq 1.1$, $0 < r < 1.0$), $Li_sNi_{1-t}M^2_tO_2$ (where $M^2$ is at least one metal element selected from the group consisting of Mg, Mn, Fe, Co, Cu, Zn, Al, Ti, Ge, and Cr, and $0 \leq s \leq 1.1$, $0 < t < 1.0$), $Li_fMn_vNi_wCo_{1-v-w}O_2$ (where $0 \leq f \leq 1.1$, $0 < v < 1.0$, $0 < w < 1.0$). One of these Li-containing transition metal oxides may be used alone, or two or more of them may be used in combination.

Among the above-described positive electrode active materials, a Ni-containing material is more suitable for fast charging since the CC charging region is increased further. In particular, a material containing Ni of 50 atomic % or more in the transition elements of the positive electrode active material is preferred. It is more preferable that the positive electrode active material containing Ni element is 20 mass % or more, further preferably 50 mass % or more, and even further preferably 100 mass % in terms of mass ratio with respect to the entire positive electrode active materials.

Various binders that are the same as those previously listed as the specific examples of the negative electrode binder can be used.

Examples of the conductivity enhancing agent include carbon materials, including, for example, graphites (graphite carbon materials) such as natural graphite (e.g., flake graphite) and artificial graphite, carbon blacks such as acetylene black, ketjen black, channel black, furnace black, lamp black, and thermal black, and carbon fiber.

The positive electrode according to the present invention can be produced, for example, through a process involving preparing a paste or slurry positive electrode material mixture-containing composition in which the positive electrode active material and the binder, and the conductivity enhancing agent are dispersed in a solvent such as NMP (however, the binder may be dissolved in the solvent), applying the composition to one or both sides of a current collector, followed by drying, and thereafter optionally performing pressing. Note, however, that the positive electrode is not limited to a positive electrode produced by the above-described production method, and may be a positive electrode produced by other production methods.

For example, the thickness of the positive electrode material mixture layer, per side of the current collector, is preferably 10 to 100 μm. The density of the positive electrode material mixture layer is calculated from the mass per unit area and the thickness of the positive electrode material mixture layer laminated on the current collector, and is preferably 3.0 to 4.5 g/cm$^3$. As the composition of the positive electrode material mixture layer, for example, the amount of the positive electrode active material is preferably 60 to 95 mass %, the amount of the binder is preferably 1 to 15 mass %, and the amount of the conductivity enhancing agent is preferably 3 to 20 mass %.

As the current collector of the positive electrode, it is possible to use the same current collectors as those used for the positive electrode of conventionally known lithium secondary batteries. Examples thereof include a foil, a punched metal, an expanded metal, a mesh, and the like made of aluminum, stainless steel, nickel, titanium or an alloy thereof. Usually, an aluminum foil having a thickness of 10 to 30 μm is preferably used.

The above-described negative electrode and positive electrode are used for a lithium secondary battery in the form of a laminated electrode body in which they are laminated so as to face each other with a separator described below interposed therebetween, or in the form of a wound electrode body in which a laminated body in which the negative electrode and the positive electrode are laminated with the separator interposed therebetween is wound in a spiral fashion.

In the present invention, where P represents the mass of the positive electrode active material and N represents the mass of the negative electrode active material, P/N is preferably 1.0 to 3.6. By setting the P/N ratio to 3.6 or less, it is possible to lower the utilization rate of the negative electrode active material to limit the chargeable electric capacity, thus suppressing the above-described volume change of the negative electrode active material due to charging/discharging and suppressing the deterioration of the charge/discharge cycle characteristics of the lithium secondary battery pack, for example, due to pulverization of the negative electrode active material particles. By setting the P/N ratio to 1.0 or more, it is possible to ensure a high battery capacity.

<Separator>

As a separator of the lithium secondary battery constituting the lithium secondary battery pack according to the present invention, it is preferable to use a separator having a sufficient strength and being capable of retaining a large amount of a non-aqueous electrolyte. For example, it is possible to use a microporous film having a thickness of 5 to 50 μm and a porosity of 30 to 70% and made of polyolefin such as polyethylene (PE) or polypropylene (PP). The microporous film constituting the separator may be a microporous film made of only PE or only PP, for example, may contain an ethylene-propylene copolymer, or may be a laminate of a PE microporous film and a PP microporous film.

As the separator, it is possible to use a laminated separator including a first porous layer composed mainly of a resin having a melting point of 140° C. or lower and a second porous layer composed mainly of a resin having a melting point of 150° C. or higher or an inorganic filler having a heat-resistant temperature of 150° C. or higher. As used herein, "melting point" refers to a melting temperature measured using a differential scanning calorimeter (DSC) in accordance with the Japanese Industrial Standards (JIS) K 7121, and "having a heat-resistant temperature of 150° C. or higher" means that no deformation such as softening is observed at least at 150° C.

The first porous layer included in the laminated separator serves mainly to ensure a shutdown function. When the temperature of the lithium secondary battery reaches a melting point or more of the resin serving as the main component of the first porous layer, the resin contained in the first porous layer melts to close the pores of the separator, causing a shutdown that suppresses the electrochemical reaction from proceeding.

The second porous layer included in the laminated separator has the function of preventing a short circuit resulting from a direct contact between the positive electrode and the negative electrode even if the internal temperature of the lithium secondary battery has increased. This function is ensured by a resin having a melting point of 150° C. or higher, or an inorganic filler having a heat-resistant temperature of 150° C. or higher. More specifically, even if the first porous layer has shrunk when the battery is heated to a high temperature, the second porous layer, which does not easily shrink, can prevent a short circuit resulting from a direct contact between the positive and negative electrodes that may occur when the separator undergoes heat shrinkage. Furthermore, the heat-resistant second porous layer serves as the skeleton of the separator, and therefore the heat shrinkage of the first porous layer, that is, the heat shrinkage of the separator as a whole can be suppressed.

The thickness of the separator relating to a lithium secondary battery (made of a polyolefin microporous film or the above-described laminated separator) is preferably 10 to 30 μm.

The separator preferably has a high mechanical strength, and preferably has, for example, a piercing strength of 3 N or more. As described above, the negative electrode active material used in the lithium secondary battery according to the present invention experiences great expansion and contraction at the time of charging/discharging. It is possible to suppress the expansion and contraction in volume by limiting the P/N ratio to a range of 1.0 to 3.6 for example, thereby improving the charge/discharge cycle characteristics. However, mechanical damage may be applied to the separator facing the negative electrode as well due to expansion and contraction of the entire negative electrode as a result of repetition of charge/discharge cycle. If the separator has a piercing strength of 3 N or more, a favorable mechanical strength can be secured, and the mechanical damage to the separator can be mitigated.

<Non-Aqueous Electrolyte>

One example of a non-aqueous electrolyte included in the lithium secondary battery constituting the lithium secondary battery pack according to the present invention is a non-aqueous electrolytic solution prepared by dissolving either, or both of an inorganic lithium salt and an organic lithium salt in any of the following solvents.

Examples of the solvent include aprotic organic solvents such as ethylene carbonate (EC), propylene carbonate (PC), butylene carbonate (BC), vinylene carbonate (VC), dimethyl carbonate (DMC), diethyl carbonate (DEC), methyl ethyl carbonate (MEC), γ-butyrolactone, 1,2-dimethoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphate triester, trimethoxymethane, a dioxolane derivative, sulfolane, 3-methyl-2-oxazolidinone, a propylene carbonate derivative, a tetrahydrofuran derivative, diethyl ether, and 1,3-propanesultone. These may be used alone or in a combination of two or more.

Examples of the inorganic lithium salt include $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lower aliphatic lithium carboxylate, $LiAlCl_4$, LiCl, LiBr, LiI, chloroborane Li, and Li tetraphenylborate. These may be used alone or in combination of two or more.

Examples of the organic lithium salt include $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3(2\leq n\leq 7)$, and $LiN(Rf^1OSO_2)_2$ (where is a fluoroalkyl group). These may be used alone or in combination of two or more.

For example, the concentration of the lithium salt contained in the non-aqueous electrolytic solution is preferably 0.2 to 3.0 mol/dm$^3$, more preferably 0.5 to 1.5 mol/dm$^3$, and even more preferably 0.9 to 1.3 mol/dm$^3$.

As the non-aqueous electrolytic solution, it is particularly preferable to use a non-aqueous electrolytic solution in which $LiPF_6$ is dissolved in a solvent containing at least one chain carbonate selected from the group consisting of dimethyl carbonate, diethyl carbonate, and methyl ethyl carbonate, and at least one cyclic carbonate selected from the group consisting of ethylene carbonate and propylene carbonate.

For the purpose of improving the charge/discharge cycle characteristics and enhancing safety such as high-temperature storage characteristics and overcharge prevention, the non-aqueous electrolytic solution may contain additives shown below as appropriate. Examples of the additive include acid anhydride, sulfonic acid ester, dinitrile, 1,3-propanesultone, diphenyl disulfide, cyclohexyl benzene, vinylene carbonate (VC), biphenyl, fluorobenzene, t-butyl benzene, cyclic fluorinated carbonate (e.g., trifluoropropylene carbonate (TFPC) and fluoroethylene carbonate (FEC)) or chain fluorinated carbonate (trifluorodimethyl carbonate (TFDMC), trifluorodiethyl carbonate (TFDEC), and trifluoroethyl methyl carbonate (TFEMC)), fluorinated ether ($Rf^2$—OR, where $Rf^2$ is an alkyl group containing fluorine, and R is an organic group that may contain fluorine)), phosphoric ester (ethyl diethyl phosphonoacetate (EDPA): $(C_2H_5O)_2(P{=}O){-}CH_2(C{=}O)OC_2H_5$), and tris(trifluoroethyl) phosphate (TFEP): $(CF_3CH_2O)_3P{=}O$, triphenyl phosphate (TPP): $(C_6H_5O)_3P{=}O$ (including derivatives of the above compounds). As described above, the pulverization of the particles due to volume contraction/expansion of the $SiO_x$/carbon composite can be suppressed by limiting the P/N ratio between the positive electrode and the negative electrode. By adding TFPC to the non-aqueous electrolytic solution, a coating film is formed on the particle surface of the $SiO_x$/carbon composite, so that even if cracks or the like occur in the particle surface as a result of repeated charging and discharging and a newly generated surface is exposed, the above-described TFPC covers the newly generated surface. Accordingly, it is possible to suppress a capacity deterioration due to charge/discharge cycles. Furthermore, since TFPC has higher resistance to oxidation-reduction as compared with FEC, it is less likely to cause an extra decomposition reaction (e.g., generation of gas) other than the formation of a coating film, and serves to suppress exothermic reaction due to decomposition reaction to inhibit an increase in internal temperature of the lithium secondary battery The non-aqueous electrolytic solution may also be used in the form of a gel electrolyte using a known gelling agent such as a polymer.

There is no particular limitation on the configuration of the lithium secondary battery included in the lithium secondary battery pack of the present invention. For example, it may have any shape such as a coin shape, a button shape, a sheet shape, a laminated configuration, a cylindrical shape, a flat shape, a prismatic shape, or may take a large-scale configuration for use in an electric car and the like.

In introducing a positive electrode, a negative electrode, and a separator into the lithium secondary battery, they may be formed into a laminated electrode body in which a plurality of positive electrodes and a plurality of negative electrodes are laminated with a separator interposed therebetween or a wound electrode body in which a positive electrode and a negative electrode are laminated with a separator disposed therebetween and the whole is further wound in a spiral fashion, in accordance with the configuration of the battery as described above.

The lithium secondary battery pack of the present invention can improve the capacity and ensure favorable fast-charging characteristics. Thus, by utilizing these characteristics, the lithium secondary battery pack can be preferably used for a power source of small and multi-functional portable devices and various applications to which conventionally known lithium secondary battery packs are used. Thereby, the electronic device of the present invention can be constituted. For example, when the lithium secondary battery pack of the present invention is installed in a charging device that has conventionally been in wide use (e.g., a constant current-constant voltage charging device or a pulse charging device), it is possible to constitute a charging system of the present invention that is capable of fast charging. With this charging system, it is possible to perform a charging method of the present invention that is capable of fast charging.

EXAMPLES

Hereinafter, the present invention will be described in detail by way of examples. It should be noted, however, that the examples given below are not intended to limit the present invention.

Example 1

<Production of Positive Electrode>

Eighty parts by mass of $LiCoO_2$ and 20 parts by mass of $LiMn_{0.1}Ni_{0.8}Co_{0.1}O_2$ each serving as a positive electrode active material, 1 part by mass of artificial graphite and 1 part by mass of ketjen black each serving as a conductivity enhancing agent, and 10 parts by mass of PVDF serving as a binder were uniformly mixed with an NMP serving as a solvent, to prepare a positive electrode material mixture-containing paste. The obtained positive electrode material mixture-containing paste was then intermittently applied onto both sides of a current collector made of an aluminum foil and having a thickness 15 μm so as to have a controlled thickness, and dried. Thereafter, the resulting structure was subjected to calendering to adjust the thickness of the positive electrode material mixture layer such that the total thickness was 103 μm, and cut to have a width of 54.5 mm, to produce a positive electrode. Furthermore, a tab was welded to an exposed portion of the aluminum foil of this positive electrode to form a lead portion.

The positive electrode material mixture layer of the positive electrode has an area of 670 $cm^2$. The value was used to calculate a current density.

<Production of Negative Electrode>

Ninety-eight parts by mass of a mixture prepared by mixing a material obtained by coating the surface of SiO with carbon (having an average particle size $D_{50}$ of 5 μm; hereinafter referred to as "SiO/C") and graphite carbon having an average particle size $D_{50}$ of 16 μm each serving as a negative electrode active material at a mass ratio of 3:97, and 1.0 part by mass of a CMC aqueous solution at a concentration of 1 mass % and having a viscosity adjusted to 1500 to 5000 mPa·s and 1.0 part by mass of SBR each serving as a binder were mixed with ion exchanged water having a specific conductance of $2.0\times10^5$ Ω/cm or more as a solvent, to prepare an aqueous negative electrode material mixture-containing paste.

In the SiO/C, the coated amount of carbon was 20 mass %, and the $I_{510}/I_{1343}$ intensity ratio of the Raman spectrum at a measurement laser wavelength of 532 nm was 0.10, and the half-width of a Si (111) diffraction peak obtained by the X-ray diffraction measurement of SiO using a CuKα ray was 1.0°.

Then, the above negative electrode material mixture-containing paste was intermittently applied onto both sides of a current collector made of a copper foil and having a thickness of 8 μm so as to have a controlled thickness, and dried. Thereafter, the resulting structure was subjected to calendering to adjust the thickness of the negative electrode material mixture layer such that the total thickness was 97 μm, and cut to have a width of 55.5 mm, to produce a negative electrode. Furthermore, a tab was welded to an exposed portion of the copper foil of this negative electrode to form a lead portion.

<Production of Separator>

5 kg of ion exchanged water and 0.5 kg of a dispersing agent (aqueous polycarboxylic acid ammonium salt, having a solid content concentration of 40 mass %) were added to 5 kg of boehmite having an average particle size $D_{50}$ of 1 μm, and the resulting mixture was subjected to a crushing treatment in a ball mill having an internal volume of 20 L for 10 hours at a rotation speed of 40 rpm, to prepare a dispersion. The treated dispersion was vacuum dried at 120° C., and observed using a scanning electron microscope (SEM), as a result of which it was found that boehmite was substantially plate-shaped.

0.5 g of xanthan gum as a thickener and 17 g of a resin binder dispersion (modified poly(butyl acrylate), having a solid content of 45 mass %) as a binder were added to 500 g of the above dispersion, and the resulting mixture was stirred with a stirrer for three hours to prepare a uniform slurry (second porous layer forming slurry having a solid content of 50 mass %).

Then, a corona discharge treatment (discharge amount: 40 W·min/$m^2$) was performed on one surface of a PE macroporous separator (a first porous layer having a thickness of 12 μm, a porosity of 40%, an average pore size of 0.08 μm, and a PE melting point of 135° C.) for a lithium secondary battery. The second porous layer forming slurry was applied to the treated surface using a micro-gravure coater, and dried to form a second porous layer having a thickness of 4 μm, thus yielding a laminated separator. In this separator, the mass per unit area of the second porous layer was 5.5 g/$m^2$, the volumetric boehmite content was 95 vol %, and the porosity was 45%.

<Preparation of Non-Aqueous Electrolytic Solution>

$LiPF_6$ as a lithium salt was dissolved at a concentration of 1.1 mol/$dm^3$ in a solvent mixture prepared by mixing EC, MEC, and DEC at a volume ratio of 1.0:0.5:1.5, to which VC, FEC, and EDPA were further added in amounts to of 2.5 mass %, 1.75 mass % and 1.00 mass % respectively to prepare a non-aqueous electrolytic solution.

<Assembly of Battery>

The positive electrode and the negative electrode produced above were placed upon each other with the above separator interposed therebetween such that the second porous layer of the separator would face the positive electrode, and wound in a spiral fashion to produce a wound electrode body. The obtained wound electrode body was pressed into a flat shape, then placed in an outer can made of an aluminum alloy and having a thickness of 4.45 mm, a width of 44 mm, and a height of 61 mm, and the above non-aqueous electrolytic solution was injected into the outer can. Then, after the injection of the non-aqueous electrolytic solution, the outer can was sealed to produce a lithium secondary battery having the structure shown in FIGS. 2A and 2B and the external appearance shown in FIG. 3.

Figure 2A:
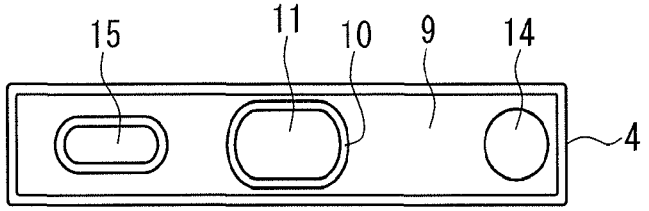
FIG. 2 schematically shows an example of a lithium secondary battery included in the lithium secondary battery pack according to the present invention, with FIG. 2A being a plan view, and FIG. 2B being a partial cross-sectional view.
Figure 2B:
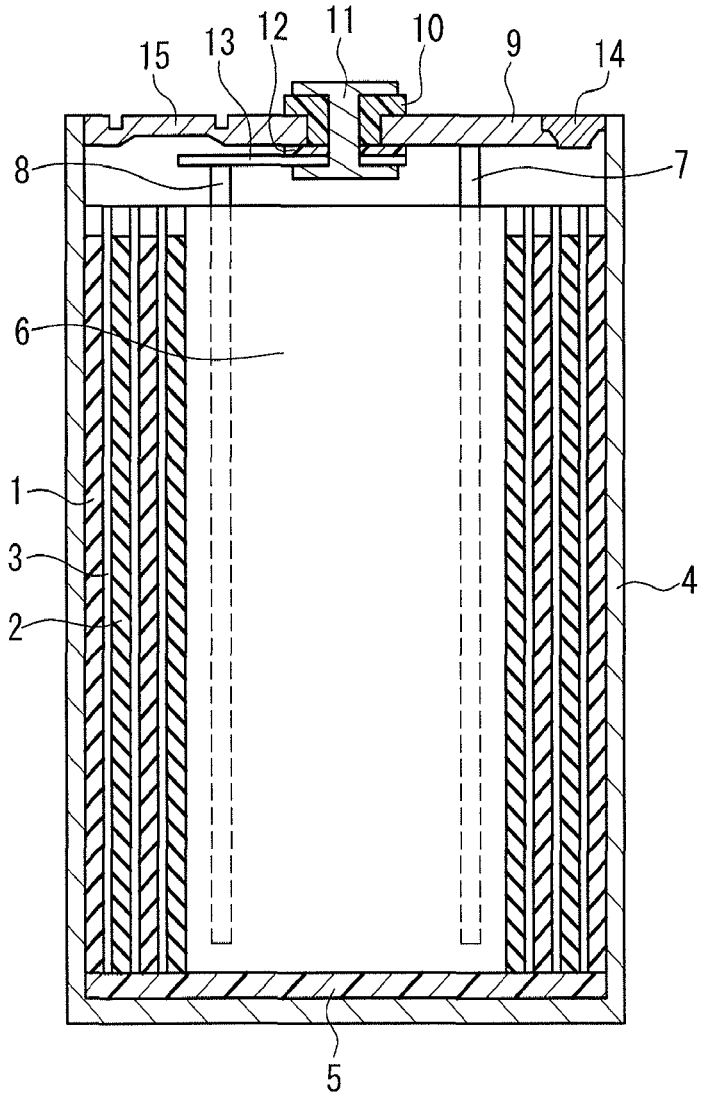

Here, a description will be given of the battery shown in FIGS. 2A, 2B, and 3. FIG. 2A is a plan view and FIG. 2B is a partial cross-sectional view. As shown in FIG. 2B, a positive electrode 1 and a negative electrode 2 are wound in a spiral fashion with a separator 3 interposed therebetween, and thereafter pressed into a flat shape to form a flat wound electrode body 6, which is housed in an outer can 4 having the shape of a rectangular cylinder, together with a non-aqueous electrolytic solution. Note that in order to simplify the illustration, the metal foils serving as current collectors, the electrolytic solution, and so forth that were used for producing the positive electrode 1 and the negative electrode 2 are not shown in FIG. 2B. Also, the layers of the separator are not shown.

The outer can 4, which is made of an aluminum alloy, constitutes the outer case of the battery. The outer can 4 also serves as a positive electrode terminal. At the bottom of the outer can 4 is disposed an insulator 5 made of a PE sheet. A positive electrode lead body 7 and a negative electrode lead body 8 connected to the ends of the positive electrode 1 and the negative electrode 2, respectively, are drawn from the flat wound electrode body 6 composed of the positive electrode 1, the negative electrode 2, and the separator 3. A stainless steel terminal 11 is attached to a sealing cover plate 9 made of an aluminum alloy for sealing the opening of the outer can 4 via a PP insulating packing 10. A stainless steel lead plate 13 is attached to the terminal 11 via an insulator 12.

The cover plate 9 is fitted within the opening of the outer can 4, and the joint between them is welded to seal the opening of the outer can 4, thus sealing the interior of the battery. In the battery shown in FIGS. 2A and 2B, the cover plate 9 is provided with a non-aqueous electrolytic solution inlet 14. The non-aqueous electrolytic solution inlet 14 is sealed by, for example, laser welding with a sealing member inserted therein, thus ensuring sealing of the battery. Therefore, the non-aqueous electrolytic solution inlet 14 of the battery of FIGS. 2A, 2B, and 3 is actually constituted by a non-aqueous electrolytic solution inlet and a sealing member, but they are shown as the non-aqueous electrolytic solution inlet 14 in order to simplify the illustration. The cover plate 9 is further provided with a cleavage vent 15 serving as a mechanism for discharging internal gas to the outside in the event of a temperature rise in the battery In this lithium secondary battery of Example 1, the positive electrode lead body 7 is directly welded to the cover plate 9, so that the outer can 4 and the cover plate 9 can function as a positive terminal. Moreover, the negative electrode lead body 8 is welded to the lead plate 13, and thus brought to be electrically conductive with the terminal 11 via the lead plate 13, so that the terminal 11 can function as a negative terminal. However, the positive and negative electrodes may be reversed depending on the material of the outer can 4 or the like.

Figure 3:
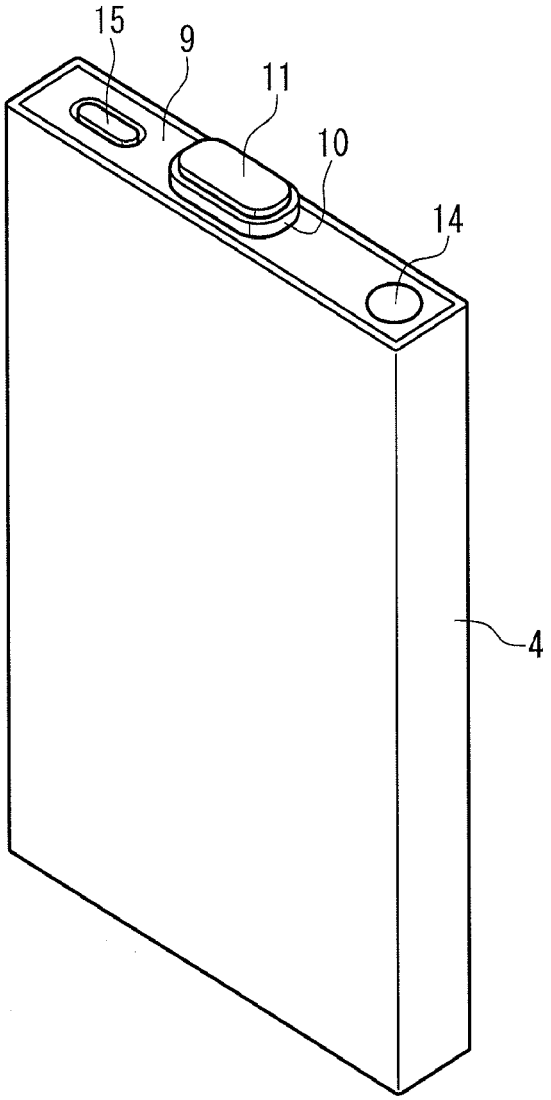
FIG. 3 is a perspective view showing an example of the lithium secondary battery included in the lithium secondary battery pack according to the present invention.

FIG. 3 is a perspective view schematically showing the external appearance of the above-described battery shown in FIGS. 2A and 2B. FIG. 3 is illustrated to indicate that the battery is a prismatic battery. In FIG. 3, the battery is schematically shown and only specific components of the battery are illustrated. Likewise, in FIG. 2B, hatching indicating cross sections is omitted for the central portion of the wound electrode body 6 and the separator 3.

As the above lithium secondary battery of Example 1, the impedance A determined by the above-described method was 33 mΩ, and the current density was 2.42 mAh/cm$^2$.

<Assembly of Lithium Secondary Battery Pack>

The lithium secondary battery of the above-described Example 1, a protection circuit including two FETs connected in parallel and each having a resistance value of 10 mΩ, and a PTC element having a resistance value of 5 mΩ, were used. These components were connected to each other with a lead wire as shown in FIG. 1, and housed in an outer case to assemble a lithium secondary battery pack of Example 1.

For the lithium secondary battery pack of Example 1, an impedance of the entire circuit unit determined by the above-described method was 58 mΩ, the rated capacity was 1620 mAh, and the energy density D of the lithium secondary battery determined by the above-described method was 465 Wh/L. An impedance index B/A, determined from the impedance A and an impedance B of the above-described lithium secondary battery pack determined by subtracting the impedance A (33 mΩ) of the lithium secondary battery from the impedance (58 mΩ) of the entire circuit unit of the lithium secondary battery pack, was 0.76.

Example 2

A lithium secondary battery of Example 2 was produced in the same manner as in Example 1 except that a graphite carbon was used alone as the negative electrode active material in place of the mixture of SiO/C and the graphite carbon, and the thickness of the material mixture layers of the positive electrode and the negative electrode was adjusted accordingly for compensating the decrease in capacity of the negative electrode, so that the whole thickness of the positive electrode was set to 99 pan and the whole thickness of the negative electrode was set to 101 μm. In the obtained lithium secondary battery of Example 2, the impedance A measured similarly to Example 1 was 35 mΩ and the current density was 2.36 mA/cm$^2$.

Next, a lithium secondary battery pack of Example 2 was produced in the same manner as in Example 1 except that the lithium secondary battery of Example 2 was used. For the obtained lithium secondary battery pack of Example 2, the impedance of the entire circuit unit measured similarly to Example 1 was 60 mΩ, the rated capacity Q was 1580 mAh, the energy density D per volume of the lithium secondary battery was 454 Wh/L, and the impedance index B/A was 0.71.

Example 3

A lithium secondary battery of Example 3 was produced in the same manner as in Example 1 except that the mass ratio of SiO/C to the graphite carbon in the negative electrode active material was modified to 10:90 and the thickness of the material mixture layers of the positive electrode and the negative electrode were adjusted accordingly for compensating the increase in capacity of the negative electrode, so that the whole thickness of the positive electrode was set to 107 μm and the whole thickness of the negative electrode was set to 91 μm. For the obtained lithium secondary battery of Example 3, the impedance A measured similarly to Example 1 was 31 mΩ and the current density was 2.49 mA/cm$^2$.

Next, a lithium secondary battery pack of Example 3 was produced in the same manner as in Example 1 except that the lithium secondary battery of Example 3 was used. For the obtained lithium secondary battery pack of Example 3, the impedance of the entire circuit unit measured similarly to Example 1 was 56 mΩ, the rated capacity Q was 1670 mAh, the energy density D per volume of the lithium secondary battery was 477 Wh/L, and the impedance index B/A was 0.81.

Example 4

A lithium secondary battery of Example 4 was produced in the same manner as in Example 1 except that the mass ratio of SiO/C to the graphite carbon in the negative electrode active material was modified to 20:80 and the thickness of the material mixture layers of the positive electrode and the negative electrode were adjusted accordingly for compensating the increase in capacity of the negative electrode, so that the whole thickness of the positive electrode was set to 112 μm and the whole thickness of the negative electrode was set to 87 μm. For the obtained lithium secondary battery of Example 4, the impedance A measured similarly to Example 1 was 30 mΩ and the current density was 2.54 mA/cm$^2$.

Next, a lithium secondary battery pack of Example 4 was produced in the same manner as in Example 1 except that the lithium secondary battery of Example 4 was used. For the obtained lithium secondary battery pack of Example 4, the impedance of the entire circuit unit measured similarly to Example 1 was 54 mΩ, the rated capacity Q was 1700 mAh, the energy density D per volume of the lithium secondary battery was 475 Wh/L, and the impedance index B/A was 0.83.

Example 5

A lithium secondary battery of Example 5 was produced in the same manner as in Example 1 except that $LiCoO_2$ was used alone as the positive electrode active material and the thickness of the material mixture layers of the positive electrode and the negative electrode was adjusted accordingly for compensating the decrease in capacity of the positive electrode, so that the whole thickness of the positive electrode was set to 103 μm and the whole thickness of the negative electrode was set to 96 μm. For the obtained lithium secondary battery of Example 5, the impedance A measured similarly to Example 1 was 33 mΩ and the current density was 2.36 mA/cm$^2$.

Next, a lithium secondary battery pack of Example 5 was produced in the same manner as in Example 1 except that the lithium secondary battery of Example 5 was used. For the obtained lithium secondary battery pack of Example 5, the impedance of the entire circuit unit measured similarly to Example 1 was 58 mΩ, the rated capacity Q was 1580 mAh, the energy density D per volume of the lithium secondary battery was 454 Wh/L, and the impedance index B/A was 0.76.

Example 6

A lithium secondary battery of Example 6 was produced in the same manner as in Example 1 except that 50 parts by mass of $LiCoO_2$ and 50 parts by mass of $LiMn_{0.1}Ni_{0.8}Co_{0.1}O_2$ were used as the positive electrode active material and the thickness of the material mixture layers of the positive electrode and the negative electrode was adjusted accordingly for compensating the increase in capacity of the positive electrode, so that the whole thickness of the positive electrode was set to 102 μm and the whole thickness of the negative electrode was set to 96 μm. In the obtained lithium secondary battery of Example 6, the impedance A measured similarly to Example 1 was 31 mΩ and the current density was 2.45 mA/cm$^2$.

Next, a lithium secondary battery pack of Example 6 was produced in the same manner as in Example 1 except that the lithium secondary battery of Example 6 was used. For the obtained lithium secondary battery pack of Example 6, the impedance of the entire circuit unit measured similarly to Example 1 was 56 mΩ, the rated capacity Q was 1640 mAh, the energy density D per volume of the lithium secondary battery was 465 Wh/L, and the impedance index B/A was 0.81.

Example 7

A lithium secondary battery of Example 7 was produced in the same manner as in Example 1 except that $LiMn_{0.1}Ni_{0.8}Co_{0.1}O_2$ was used alone as the positive electrode active material and the thickness of the material mixture layers of the positive electrode and the negative electrode was adjusted accordingly for compensating the increase in capacity of the negative electrode, so that the whole thickness of the positive electrode was set to 101 μm and the whole thickness of the negative electrode was set to 97 μm. For the obtained lithium secondary battery of Example 7, the impedance A measured similarly to Example 1 was 29 mΩ and the current density was 2.43 mA/cm$^2$.

Next, a lithium secondary battery pack of Example 7 was produced in the same manner as in Example 1 except that the lithium secondary battery of Example 7 was used. For the obtained lithium secondary battery pack of Example 7, the impedance of the entire circuit unit measured similarly to Example 1 was 54 mΩ, the rated capacity Q was 1630 mAh, the energy density D per volume of the lithium secondary battery was 455 Wh/L, and the impedance index B/A was 0.86.

Example 8

A lithium secondary battery of Example 8 was produced in the same manner as in Example 1 except that the area of the positive electrode material mixture layer was set to 580 cm$^2$ and the length of the negative electrode was adjusted accordingly, so that the whole thickness of the positive electrode was set to 119 μm and the whole thickness of the negative electrode was set to 112 μm. For the obtained lithium secondary battery of Example 8, the impedance A measured similarly to Example 1 was 34 mΩ and the current density was 2.88 mA/cm$^2$.

Next, a lithium secondary battery pack of Example 8 was produced in the same manner as in Example 1 except that the lithium secondary battery of Example 8 was used. For the obtained lithium secondary battery pack of Example 8, the impedance of the entire circuit unit measured similarly to Example 1 was 59 mΩ, the rated capacity Q was 1670 mAh, the energy density D per volume of the lithium secondary battery was 480 Wh/L, and the impedance index B/A was 0.74.

Example 9

A lithium secondary battery of Example 9 was produced in the same manner as in Example 1 except that a protection circuit including two FETs connected in series each having a resistance value of 14 mΩ and a PTC element having a resistance value of 5 mΩ were used. For the obtained lithium secondary battery pack of Example 9, the impedance of the entire circuit unit measured similarly to Example 1 was 66 mΩ, the rated capacity Q was 1610 mAh, the energy density D per volume of the lithium secondary battery was 462 Wh/L, and the impedance index B/A was 1.00.

Comparative Example 1

A lithium secondary battery of Comparative Example 1 was produced in the same manner as in Example 1 except that the area of the positive electrode material mixture layer was set to 757 $cm^2$ and the length of the negative electrode was adjusted accordingly, so that the whole thickness of the positive electrode was set to 90 μm and the whole thickness of the negative electrode was set to 82 μm. In the obtained lithium secondary battery of Comparative Example 1, the impedance A measured similarly to Example 1 was 31 mΩ and the current density was 2.01 $mA/cm^2$.

Next, a lithium secondary battery pack of Comparative Example 1 was produced in the same manner as in Example 1 except that the lithium secondary battery of Comparative Example 1 was used. For the obtained lithium secondary battery pack of Comparative Example 1, the impedance of the entire circuit unit measured similarly to Example 1 was 56 mΩ, the rated capacity Q was 1520 mAh, the energy density D per volume of the lithium secondary battery was 437 Wh/L, and the impedance index B/A was 0.81.

Comparative Example 2

A lithium secondary battery of Comparative Example 2 was produced in the same manner as in Example 1 except that the area of the positive electrode material mixture layer was set to 487 $cm^2$ and the length of the negative electrode was adjusted accordingly, so that the whole thickness of the positive electrode was set to 145 μm and the whole thickness of the negative electrode was set to 134 μm. For the obtained lithium secondary battery of Comparative Example 2, the impedance A measured similarly to Example 1 was 35 mΩ and the current density was 3.57 $mA/cm^2$.

Next, a lithium secondary battery pack of Comparative Example 2 was produced in the same manner as in Example 1 except that the lithium secondary battery of Comparative Example 2 was used. For the obtained lithium secondary battery pack of Comparative Example 2, the impedance of the entire circuit unit measured similarly to Example 1 was 60 mΩ, the rated capacity Q was 1740 mAh, the energy density D per volume of the lithium secondary battery was 500 Wh/L, and the impedance index B/A was 0.71.

Comparative Example 3

A lithium secondary battery of Comparative Example 3 was produced in the same manner as in Example 1 except that a protection circuit including two FETs connected in series each having a resistance value of 25 mΩ and a PTC element having a resistance value of 10 mΩ were used. For the obtained lithium secondary battery pack of Comparative Example 3, the impedance of the entire circuit unit measured similarly to Example 1 was 93 mΩ, the rated capacity Q was 1600 mAh, the energy density D per volume of the lithium secondary battery was 460 Wh/L, and the impedance index B/A was 1.82.

Table 1 shows the compositions of the positive electrode active materials and the negative electrode active materials used for the lithium secondary battery packs in Examples 1 to 9 and Comparative Examples 1 to 3.

TABLE 1

| | Mass ratio of $LiCoO_2$ to $LiMn_{0.1}Ni_{0.8}CO_{0.1}O_2$ | Composition of negative electrode active material | Content of SiO/C (mass %) |
|---|---|---|---|
| Example 1 | 8/2 | SiO/C and graphite carbon | 3 |
| Example 2 | 8/2 | Graphite carbon | 0 |
| Example 3 | 8/2 | SiO/C and graphite carbon | 10 |
| Example 4 | 8/2 | SiO/C and graphite carbon | 20 |
| Example 5 | 10/0 | SiO/C and graphite carbon | 3 |
| Example 6 | 5/5 | SiO/C and graphite carbon | 3 |
| Example 7 | 0/10 | SiO/C and graphite carbon | 3 |
| Example 8 | 8/2 | SiO/C and graphite carbon | 3 |
| Example 9 | 8/2 | SiO/C and graphite carbon | 3 |
| Comparative Example 1 | 8/2 | SiO/C and graphite carbon | 3 |
| Comparative Example 2 | 8/2 | SiO/C and graphite carbon | 3 |
| Comparative Example 3 | 8/2 | SiO/C and graphite carbon | 3 |

Next, each of the lithium secondary battery packs of Examples 1 to 9 and Comparative Examples 1 to 3 was combined with a charge/discharge apparatus to form a charging system, and each charging system was subjected to a fast charging test by the following charging method.

<Fast Charging Test>

Using each of the above-described charging systems, a CC-CV charging (with a cut-off current value of 0.05 C) was performed for each capacity in which charging was performed at 25° C. with a constant current of 1.5 C with respect to the respective rated capacity (corresponding to 2.43 A in a case of 1.62 Ah) until the voltage value reached 4.2 V, and thereafter constant voltage charging was performed with the voltage maintained at 4.2 V. Then, the CC charging time (minute), which is the time required from the start of charging until the charging was switched to a constant voltage mode, and the time (minute) required from the start of charging to charging up to a state of charge (SOC) of 90%, were measured. Table 2 below shows the results and also the characteristics of the used lithium secondary battery packs.

TABLE 2

| | Energy density D (Wh/L) | Current density (mA/cm$^2$) | Impedance A (mΩ) | Impedance B (mΩ) | Impedance Index B/A | CC charging time (min.) | SOC 90% charging time (min.) |
|---|---|---|---|---|---|---|---|
| Example 1 | 465 | 2.42 | 33 | 25 | 0.76 | 33 | 38 |
| Example 2 | 454 | 2.36 | 35 | 25 | 0.71 | 29 | 42 |
| Example 3 | 477 | 2.49 | 31 | 25 | 0.81 | 34 | 35 |
| Example 4 | 475 | 2.54 | 30 | 25 | 0.83 | 36 | 34 |
| Example 5 | 454 | 2.36 | 33 | 25 | 0.76 | 29 | 42 |
| Example 6 | 465 | 2.45 | 31 | 25 | 0.81 | 33 | 38 |
| Example 7 | 455 | 2.43 | 29 | 25 | 0.86 | 34 | 35 |
| Example 8 | 480 | 2.88 | 34 | 25 | 0.74 | 30 | 43 |
| Example 9 | 462 | 2.42 | 33 | 33 | 1.00 | 30 | 43 |
| Comparative Example 1 | 437 | 2.01 | 31 | 25 | 0.81 | 34 | 35 |
| Comparative Example 2 | 500 | 3.57 | 35 | 25 | 0.71 | 23 | 56 |
| Comparative Example 3 | 460 | 2.42 | 33 | 60 | 1.82 | 18 | 62 |

As shown in Table 2, it is evident that in Examples 1 to 9, the CC charging time in a fast charging test is longer and thus the charging time up to SOC of 90% can be decreased in comparison with Comparative Example 2 where the current density exceeds 3.0 mA/cm$^2$ and Comparative Example 3 where the impedance index B/A exceeds 1.

Although comparatively favorable results were obtained for the CC charging time in a fast charging test and a charging time up to SOC of 90% in Comparative Example 1, the energy density D was less than 450 Wh/L.

Further, in Example 1 and Examples 3 to 9 where SiO/C is used for the negative electrode active material, the capacity of the negative electrode is increased and the negative electrode can be made thinner by reducing the amount of coated negative electrode material mixture. Therefore, there is a tendency that the fast charging performance is improved. Furthermore, in Examples 1 to 4 and Examples 6 to 9 where a Ni-containing material is used for the positive electrode active material, it is evident that the CC charging time is increased and thus the fast charging performance is improved.

The invention may be embodied in other forms without departing from the spirit or essential characteristics thereof. The embodiments disclosed in the present application are merely examples, and thus the present invention is not limited thereto. The scope of the present invention should be construed in view of the appended claims, rather than the foregoing description, and all changes that come within the meaning and range of equivalency of the claims are intended to be embraced therein.

INDUSTRIAL APPLICABILITY

The lithium secondary battery pack of the present invention can be preferably used for a variety of applications, including a power source for small and multifunctional portable devices, for which conventional lithium secondary battery packs have been used.

EXPLANATION OF LETTERS AND NUMERALS

100 Lithium secondary battery
101 PTC element
102 Protection circuit
103a, 103b FET
104 Control unit
1 Positive electrode
2 Negative electrode
3 Separator
4 Outer can
5 Insulator
6 Wound electrode body
7 Positive electrode lead body
8 Negative electrode lead body
9 Cover plate
10 Insulating packing
11 Terminal
12 Insulator
13 Lead plate
14 Non-aqueous electrolytic solution inlet
15 Cleavage vent

The invention claimed is:

1. A lithium secondary battery pack comprising:

a lithium secondary battery comprising [an electrode body formed of] a positive electrode and a negative electrode[facing each other and a separator interposed therebetween, and a non-aqueous electrolyte; a PTC element;]; and a protection circuit[comprising a field effect transistor.], wherein the negative electrode [comprises a negative electrode material mixture layer that] contains an Si-containing material as a negative electrode active material, the lithium secondary battery has an energy density per volume of 450 Wh/L or more, the lithium secondary battery has a current density of 3.0 mA/cm$^2$ or less, and a relational expression (1) and a relational expression (2) below are established where A (mΩ) is an impedance of the lithium secondary battery, B (mΩ) is an impedance of an entire circuit unit of the lithium secondary battery pack excepting the impedance A (mΩ) of the lithium secondary battery, and the impedance B (mΩ) is determined by subtracting the impedance A (mΩ) from the impedance of the entire circuit unit of the lithium secondary battery pack:

$$A \leq 50\ m\Omega \quad (1)$$

$$B/A \leq 1 \quad (2).$$

2. The lithium secondary battery pack according to claim 1, wherein the Si-containing material is a material containing Si and O as constituent elements.

3. The lithium secondary battery pack according to claim 1, wherein the Si-containing material is a composite comprising a material containing Si and O as constituent elements serving as a core material and a carbon coating layer formed on a surface of the core material.

4. The lithium secondary battery pack according to claim 3, wherein the material containing Si and O as constituent elements is a material represented by a general compositional formula $SiO_x$, where x is $0.5 \leq x \leq 1.5$.

5. The lithium secondary battery pack according to claim 2, wherein the material containing Si and O as constituent elements is a material represented by a general compositional formula $SiO_x$, where x is $0.5 \leq x \leq 1.5$.

6. The lithium secondary battery pack according to claim 1, wherein the positive electrode [comprises a positive electrode material mixture layer containing] *contains* a Ni-containing material as a positive electrode active material.

7. An electronic device comprising the lithium secondary battery pack according to claim 6.

8. A charging system comprising the lithium secondary battery pack according to claim 5.

9. A charging method comprising the lithium secondary battery pack according to claim 6.

10. An electronic device comprising the lithium secondary battery pack according to claim 1.

11. A charging system comprising the lithium secondary battery pack according to claim 1.

12. A charging method comprising the lithium secondary battery pack according to claim 1.

13. A lithium secondary battery pack comprising:

a lithium secondary battery comprising [an electrode body formed of] a positive electrode and a negative electrode[facing each other and a separator interposed therebetween, and a non-aqueous electrolyte; a PTC element;]*;* and a protection circuit[comprising a field effect transistor,], wherein the positive electrode [comprises a positive electrode material mixture layer that] contains a Ni-containing material as a positive electrode active material, the lithium secondary battery has an energy density per volume of 450 Wh/L or more, the lithium secondary battery has a current density of 3.0 $mA/cm^2$ or less, and a relational expression (1) and a relational expression (2) below are established where A (mΩ) is an impedance of the lithium secondary battery, B (mΩ) is an impedance of an entire circuit unit of the lithium secondary battery pack excepting the impedance A (mΩ) of the lithium secondary battery, and the impedance B (mΩ) is determined by subtracting the impedance A (mΩ) from the impedance of the entire circuit unit of the lithium secondary battery pack:

$$A \leq 50\ m\Omega \quad (1)$$

$$B/A \leq 1 \quad (2).$$

14. An electronic device comprising the lithium secondary battery pack according to claim 13.

15. A charging system comprising the lithium secondary battery pack according to claim 13.

16. A charging method comprising the lithium secondary battery pack according to claim 13.

*17. The lithium secondary battery pack of claim 1, wherein the impedance index B/A of relational expression (2) is established as:*

$$0.71 \leq B/A \leq 0.86\ (2).$$

*18. The lithium secondary battery pack of claim 1, wherein the protection circuit comprises a field effect transistor.*

*19. The lithium secondary battery pack of claim 13, wherein the impedance index B/A of relational expression (2) is established as:*

$$0.71 \leq B/A \leq 0.86\ (2).$$

*20. The lithium secondary battery pack of claim 13 wherein the protection circuit comprises a field effect transistor.*

* * * * *